(12) United States Patent
Ma et al.

(10) Patent No.: US 12,202,150 B2
(45) Date of Patent: Jan. 21, 2025

(54) ROBOT MASTER CONTROL SYSTEM

(71) Applicant: Suzhou Engoal Intelligent Technologies Co., Ltd, Suzhou (CN)

(72) Inventors: Zhanpeng Ma, Suzhou (CN); He Wang, Suzhou (CN); Hong Qian, Suzhou (CN)

(73) Assignee: Suzhou Engoal Intelligent Technologies Co., Ltd, Suzhou (CN)

( * ) Notice: Subject to any disclaimer, the term of this patent is extended or adjusted under 35 U.S.C. 154(b) by 227 days.

(21) Appl. No.: 17/751,594

(22) Filed: May 23, 2022

(65) Prior Publication Data

US 2023/0129871 A1 Apr. 27, 2023

(30) Foreign Application Priority Data

Oct. 27, 2021 (CN) .......................... 202111257574.3

(51) Int. Cl.
*B25J 9/16* (2006.01)
*B25J 9/00* (2006.01)
(Continued)

(52) U.S. Cl.
CPC ........... *B25J 9/1682* (2013.01); *B25J 9/0096* (2013.01); *B25J 9/1697* (2013.01); *B25J 13/08* (2013.01);
(Continued)

(58) Field of Classification Search
CPC ...... B25J 9/1682; B25J 9/1669; B25J 9/0096; B25J 9/1697; B25J 9/1664;
(Continued)

(56) References Cited

U.S. PATENT DOCUMENTS

2012/0323363 A1* 12/2012 Izumi .................... B25J 9/1697
901/47
2013/0103179 A1 4/2013 Miyoshi
(Continued)

FOREIGN PATENT DOCUMENTS

CN 108062083 A 5/2018
CN 108628260 A 10/2018
(Continued)

OTHER PUBLICATIONS

Zen Andy et al: "Multi-view Self-supervised Deep Learning for 6D Pose Estimation in the Amazon Picking Challenge", 2017 IEEE International Conference on Robotics and Automation (ICRA), May 29, 2017, pp. 1386-1383, XP033126907, DOI: 10.1109/ICRA.2017.7989165.

(Continued)

*Primary Examiner* — Khoi H Tran
*Assistant Examiner* — Tanner L Cullen
(74) *Attorney, Agent, or Firm* — FIDELI LAW PLLC

(57) ABSTRACT

The present disclosure relates to a robot master control system. The robot master control system includes: a master controller, configured to control at least one dual-robot control system, where each of the least one dual-robot control system includes a first robot, a second robot, and a sub-controller controlling the first robot and the second robot, and the sub-controller is controlled by the master controller. In the present disclosure, multiple robots may be coordinated and comprehensively controlled to grab and move objects. Compared with a single robot, the efficiency of the multiple robots operation is greatly improved. In addition, each dual-robot control system may be individually configured, thereby improving the work efficiency of coordinated work of dual-robot control systems.

17 Claims, 4 Drawing Sheets

(51) Int. Cl.
  *B25J 13/08* (2006.01)
  *G05B 19/4155* (2006.01)
  *G06N 3/045* (2023.01)
  *G06N 3/08* (2023.01)

(52) U.S. Cl.
  CPC ......... *G05B 19/4155* (2013.01); *G06N 3/045* (2023.01); *G06N 3/08* (2013.01); *G05B 2219/50391* (2013.01)

(58) Field of Classification Search
  CPC ........... G05B 2219/39121; G05B 2219/39117; G05B 2219/40007; G05B 2219/45063; G05B 2219/40053; G05B 2219/39484; G06N 3/08; G06N 3/0464; G06N 3/045; G06N 3/04; G06N 3/044; G06V 10/82; G06V 10/806
  See application file for complete search history.

(56) References Cited

U.S. PATENT DOCUMENTS

| | | | |
|---|---|---|---|
| 2018/0164788 A1* | 6/2018 | Shimamura | B25J 9/0093 |
| 2018/0215035 A1 | 8/2018 | Ono et al. | |
| 2018/0282079 A1 | 10/2018 | Heath et al. | |
| 2020/0306980 A1 | 10/2020 | Choi et al. | |
| 2020/0327679 A1 | 10/2020 | Ji | |
| 2021/0053230 A1 | 2/2021 | Mizoguchi et al. | |
| 2021/0122586 A1 | 4/2021 | Sun et al. | |
| 2021/0237990 A1 | 8/2021 | Morency et al. | |
| 2021/0395023 A1* | 12/2021 | Patil | B25J 9/0084 |
| 2022/0318942 A1* | 10/2022 | Oda | B25J 9/163 |
| 2023/0031579 A1* | 2/2023 | Yu | G06V 10/7715 |
| 2023/0401838 A1* | 12/2023 | Chen | G06V 10/803 |
| 2024/0169687 A1* | 5/2024 | Qi | G06N 3/0475 |

FOREIGN PATENT DOCUMENTS

| | | |
|---|---|---|
| EP | 3866113 A1 | 8/2021 |
| JP | 2005262369 A | 9/2005 |
| WO | 2020048664 A1 | 3/2020 |
| WO | 2021051965 A1 | 3/2021 |
| WO | 2021174821 A1 | 9/2021 |

OTHER PUBLICATIONS

Yao Zhaojian et al: "Multi-pathway feature integration network for salient object detection", Neurocomputing, Elsevier, Amsterdam, NL, vol. 461, Aug. 20, 2021 (Aug. 20, 2021), pp. 462-478, XP086797159.

* cited by examiner

ROBOT MASTER CONTROL SYSTEM

RELATED APPLICATIONS

This application is a continuation application of Chinese application No. CN 202111257574.3, filed on Oct. 27, 2021, and the content of which is incorporated herein by reference in its entirety.

TECHNICAL FIELD

The present disclosure relates to the field of machinery, and in particular, a robot master control system.

BACKGROUND

Robots are intelligent machines that may operate semi-autonomously or fully autonomously, have basic functions such as sensing, decision-making, and executing tasks, and may assist or even replace humans in completing dangerous, laborious, and complex tasks. With the development in fields such as intelligent decision-making and automatic control, robots may be widely used in various fields. However, the operation efficiency of a single robot is low, and how to coordinate multiple robots to operate to improve the operation efficiency has become a new topic that needs to be addressed.

BRIEF SUMMARY

To resolve at least one of the above technical problems, the present disclosure provides a robot master control system.

According to some exemplary embodiments of the present disclosure, a robot master control system is provided, including: a master controller, configured to control at least one dual-robot control system, where each of the least one dual-robot control system includes a first robot, a second robot, and a sub-controller controlling the first robot and the second robot, and the sub-controller is controlled by the master controller.

It is to be understood that the above general disclosures and the following detailed disclosures are merely for exemplary and explanatory purposes, and are not to limit the present disclosure.

Other features and aspects of the present disclosure will become clear based on the following detailed disclosure of some exemplary embodiments with reference to the accompanying drawings.

BRIEF DESCRIPTION OF THE DRAWINGS

In order to more clearly illustrate some exemplary embodiments of the present disclosure, the following will briefly describe the accompanying drawings. Obviously, the drawings in the following disclosure are merely some exemplary embodiments of the present disclosure, and other drawings may also be obtained according to these drawings without exerting inventive effort by those of ordinary skill in the art.

DETAILED DESCRIPTION

Figure 1:
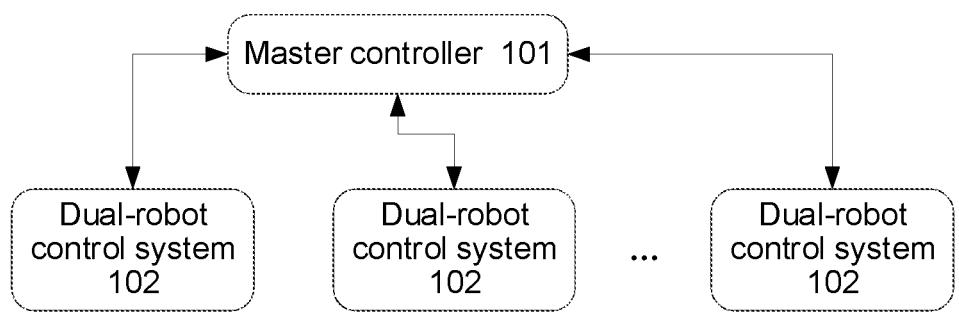
FIG. 1 is a schematic diagram of a robot master control system according to some exemplary embodiments of the present disclosure.

The technical solution in the exemplary embodiment of the present disclosure will be clearly described in combination with the accompanying drawings. Obviously, the described embodiments are only some of the exemplary embodiments of the present disclosure, but not all of the embodiments. Based on the exemplary embodiments of the present disclosure, all other embodiments obtained by those of ordinary skilled in the art without exerting creative effort shall fall within the scope of protection of the present disclosure.

It should be noted that, in the specification, claims, and the foregoing accompanying drawings of the present disclosure, the terms "first", "second", and so on are intended to distinguish between similar objects rather than indicating a specific order. It should be understood that the data may be interchanged, so that the exemplary embodiments of the present disclosure described herein may be implemented in an order other than those illustrated or described herein. Moreover, the terms "include", "contain", "comprise" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

The following will describe various exemplary embodiments, features and aspects of the present disclosure in detail with reference to the accompanying drawings. Same or similar accompanying symbols in the accompanying drawings may represent elements with the same or similar functions. Although various aspects of the exemplary embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

The term "and/or" used herein is simply a disclosure of the association relationship of the associated objects, indicating that three relationships may exist. For example, A and/or B may represent the following three cases: Only A exists, both A and B exist, and only B exists. In addition, the term "at least one" used herein means any one or any combination of at least two of a plurality, for example, including at least one of A, B, and C may mean including any one or more elements selected from a set formed by A, B and C.

In addition, for better illustration of the present disclosure, various specific details are given in the following disclosure. A person of ordinary skill in the art should understand that the present disclosure may also be implemented without the specific details. In some exemplary embodiments, methods, means, components, and circuits well known by a person skilled in the art are not described in detail, so that the subject matter of the present disclosure may be highlighted.

The exemplary embodiments of the present disclosure provide a robot master control system. As shown in FIG. 1, the robot master control system may include:

A master controller 101, configured to control at least one robot control system. A person skilled in the art may understand that the at least one robot control system may control at least one robot. In some exemplary embodiments of the present disclosure, for illustration purpose only, the at least one robot control system may be a dual-robot control system 102. The master controller may control each dual-robot control system 102 independently.

Each dual-robot control system 102 may include a first robot, a second robot, a loading table, an image capturing device (e.g., a camera), and a sub-controller. The first robot, the second robot, the loading table, and the image capturing device may all be controlled by the sub-controller. Each sub-controller may be controlled by the master controller. For each dual-robot control system 102, the image capturing device may be configured to: take photos of the objects on top of the loading table from above, that is, obtain a first image, and transmit the captured first image to the sub-controller. The sub-controller may be configured to control the first robot and the second robot according to the photos.

In some exemplary embodiments, the first and/or second robot in the present disclosure may be a robot capable of carrying objects. For example, the robot may include a manipulator or a suction cup and may grab or suck an object and carry the object to a designated end point position.

Figure 2:
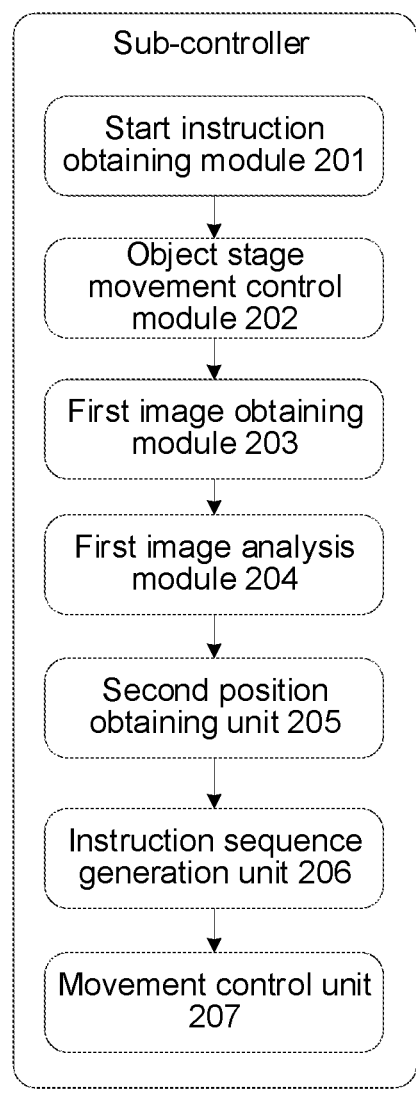
FIG. 2 is a schematic diagram of a sub-controller according to some exemplary embodiments of the present disclosure.

In some exemplary embodiments, as shown in FIG. 2, the sub-controller may include:

a start instruction obtaining module 201, configured to obtain a start instruction outputted by the master controller; and a loading table movement control module 202, configured to control the loading table to move to a first position, where when the loading table is at the first position, the first robot and the second robot stand on opposite side of the loading table. The first position in some exemplary embodiments may be set by the master controller.

A first image obtaining module 203 may be configured to trigger the image capturing device to perform shooting to obtain the first image captured by the image capturing device.

A first image analysis module 204 may be configured to analyze the first image to obtain a distribution of the objects on top of the loading table.

A second position obtaining unit 205 may be configured to obtain a second position, where the second position may be an end point position to which the first robot and/or the second robot conveys an object. The second position in some exemplary embodiments may also be set by the master controller.

An instruction sequence generation unit 206 may be configured to generate, according to the distribution of the objects in the first image and the second position, a first instruction sequence used for controlling the first robot and a second instruction sequence used for controlling the second robot.

A movement control unit 207 may be configured to respectively control the first robot and the second robot based on the first instruction sequence and the second instruction sequence.

Figure 3:
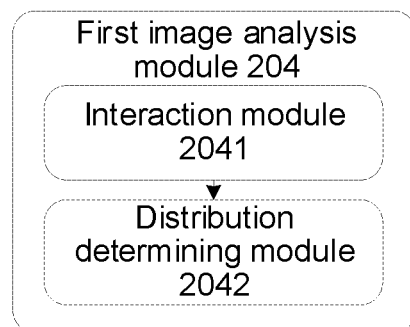
FIG. 3 is a schematic diagram of a first image analysis module according to some exemplary embodiments of the present disclosure.

As shown in FIG. 3, the first image analysis module 204 may include:

an interaction module 2041, configured to interact with a preset neural network to obtain boundary information of the objects in the first image; and a distribution determining module 2042, configured to obtain the distribution of the objects in the first image according to the boundary information.

In existing technologies, the accuracy of object boundary recognition is not high, which may affect a boundary information obtaining result and further affect the accuracy of a final control instruction (such as path planning). Therefore, in some exemplary embodiments of the present disclosure, a new neural network may be self-designed and trained to improve the accuracy of object boundary recognition. The neural network may include: a hierarchical convolutional network, an attention-based coding network, a fusion network, and a recognition network.

The neural network may be trained by using the following method:

obtaining a sample image, where labels of the sample image indicate boundary information of objects in the sample image;

performing hierarchical convolution on the sample image based on the hierarchical convolutional network to obtain first feature information;

performing attention-based coding on the sample image based on the attention-based coding network to obtain second feature information;

fusing the first feature information and the second feature information based on the fusion network to obtain third feature information;

inputting the third feature information into the recognition network to obtain boundary prediction information; and training the neural network and optimizing parameters of the neural network based on a difference between the boundary prediction information and the labels.

In existing technologies, the feature extraction capability of a conventional convolutional network may be insufficient and may not fully mine sufficient detailed information or sufficient recognizable information for target recognition. Therefore, in some exemplary embodiments of the present disclosure, a hierarchical convolutional network may be designed to extract adequately recognizable information layer by layer, thereby increasing the enrichment of information in the extracted first feature information. The hierarchical convolutional network in some exemplary embodiments of the present disclosure may include at least two extraction branches. Certainly, the quantity of extraction branches is not limited in the present disclosure. However, a larger quantity of extraction branches may indicate a lower speed, and accordingly a better extraction effect.

For example, when the hierarchical convolutional network includes two extraction branches, a first branch performs a feature extraction operation on an inputted image, to obtain a first feature extraction result. The first feature extraction result may be inputted into a second branch after a feature filtering operation, and a second feature extraction result may be obtained after a feature extraction operation of the second branch. The first feature extraction result and the second feature extraction result may be fused, so that hidden information may be mined to obtain a more thorough extraction result.

Figure 4:
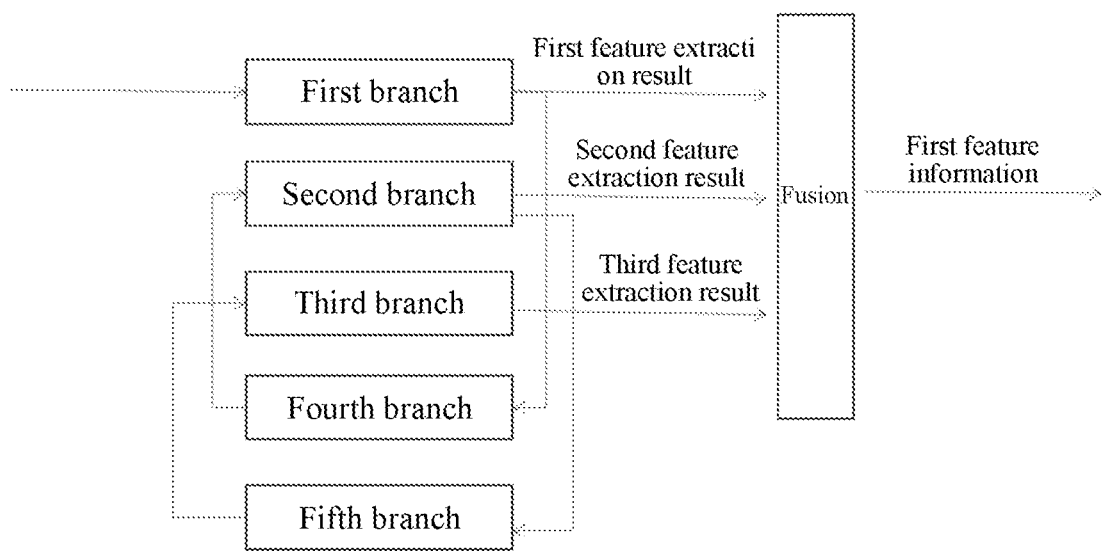
FIG. 4 is a schematic diagram of a hierarchical convolutional network according to some exemplary embodiments of the present disclosure.

FIG. 4 is a schematic diagram of a hierarchical convolutional network. In some exemplary embodiments, three extraction branches may be used. The hierarchical convolutional network may include a first branch, a second branch, and a third branch. The first branch, the second branch, and the third branch may all be configured to perform a feature extraction operation. A specific feature extraction operation is not limited in the present disclosure. For example, the feature extraction operation may be a convolution operation or a multi-scale convolution operation.

In addition, the hierarchical convolutional network may further include a fourth branch and a fifth branch. The fourth branch and the fifth branch may be respectively connected to the first branch and the second branch and may be both configured to perform a feature filtering operation. For example, the feature filtering operation may include an importance degree determining operation and a feature erasing operation based on the importance degree.

Taking the fourth branch as an example, an original feature filtering operation in this embodiment is exemplarily described in detail as follows. The first feature extraction result outputted by the first branch may be inputted into the fourth branch. Region division may be performed in the fourth branch to obtain, for example, at least nine regions. Importance degree determining may be performed on information in the first feature extraction result and corresponds to each region, to obtain a first importance degree corresponding to each of the nine regions. Information corresponding to a region with a first importance degree greater than a preset threshold may be erased from the first feature extraction result to obtain a first correction information. The first correction information may be outputted by the fourth branch and used as an input of the second branch.

In some exemplary embodiments, the information corresponding to a relatively important region has already been expressed in the first feature extraction result. After erasing such relatively important information, the fourth branch may record information corresponding to a less important region in the first correction information, and input the first correction information into a next branch (the second branch) to continue to perform feature extraction and obtain the second feature extraction result, so that the hidden information may be mined, and information that is difficult to be extracted in the existing technologies may be extracted by the next branch. Based on such a conception, information that is difficult to be extracted may be mined layer by layer.

Similarly, the second branch may obtain the second feature extraction result through a feature extraction operation. The second feature extraction result may be then inputted into the fifth branch to perform a feature filtering operation (similar to the feature filtering operation performed by the fourth branch) to obtain a second correction information. The second correction information may be inputted into the third branch to obtain a third feature extraction result by a feature extraction operation.

Finally, the first feature extraction result, the second feature extraction result, and the third feature extraction result respectively outputted by the first branch, the second branch, and the third branch may be fused, so that information mined layer by layer may be fused to obtain the first feature information that is highly recognizable.

Further, in the existing technologies the feature extraction capability of a conventional convolutional network may be insufficient. In view of this, in some exemplary embodiments of the present disclosure, a unique hierarchical convolutional network may be designed for multi-layer mining, so as to partially or completely compensate such insufficiency. However, even if information that is fully recognizable is extracted by using a hierarchical convolutional network, the quality of such information may still not meet requirements for the boundary prediction accuracy in some exemplary embodiments of the present disclosure. This is because the hierarchical convolutional network uses a convolution operation as a core operation of feature extraction, but the convolution operation lacks the ability to control global information and pays more attention to local information within the convolution sensory field. Such a lack of the ability to control the global information may affect the expressiveness of the first feature information.

In order to solve this problem, some exemplary embodiments of the present disclosure provide an attention-based coding performed on a sample image. The attention-based coding process may serialize the sample image, and a coding process of a serialized result focuses on global information, so that the obtained second feature information may include sufficient global information. A specific execution process of an attention-based coding operation and a convolution operation is not described in the present disclosure, and reference may be made to the related technologies of the neural network.

Coding points are treated equally without discrimination in attention-based coding in the existing technologies. However, such a processing manner may reduce the convergence speed of the neural network in some exemplary embodiments of the present disclosure, thus needs to be improved. In some exemplary embodiments of the present disclosure, weights may be respectively set for coding points in the process of attention-based coding. The weights may respectively represent importance degrees of the coding points. After the attention-based coding is performed on the coding points to obtain coding information corresponding to the coding points, weight-based information fusion may be performed on the coding points to obtain the second feature information. A main purpose of such an operation is to enable the foregoing neural network to converge faster.

In some exemplary embodiments of the present disclosure, a reasonable degree of weight setting may have certain impact on the convergence speed. Some exemplary embodiments of the present disclosure further provide a weight calculation method for a coding point PA. PA may be any one of the foregoing coding points, and the weight calculation method may include:

calculating a distance between coding information corresponding to a coding point other than the coding point PA and coding information corresponding to the coding point PA, and determining a weight based on the distance. Determining a weight based on a distance may rationalize the weight setting, thereby further improving the convergence speed.

In some exemplary embodiments, the first feature information may include adequately recognizable information and focus on local parts of the sample image, the second feature information may focus on global information of the sample image, and the third feature information obtained by fusing the first feature information and the second feature information may be high quality information including those features.

The loss of the neural network in some exemplary embodiments of the present disclosure may include two parts: a first loss may be generated based on the difference between the foregoing boundary prediction information and the foregoing labels, and a second loss may be generated by an importance degree determining process. That is, the second loss may be a loss generated by branches that perform an importance degree determining operation. Using FIG. 4 as an example, the second loss may be a sum of losses generated by the fourth branch and the fifth branch.

Specifically, using the loss generated by the fourth branch as an example, the loss generated by the fourth branch may be determined by using the following method:

S1: erasing, for each region, information corresponding to the region from the first feature extraction result, performing target recognition on a result after the erasing, and determining a second importance degree of the region based on the difference between a target recognition result and the labels;

S2: performing, for each region, a self-fusion operation on the information corresponding to the region in the first feature extraction result, to obtain an information indicator value corresponding to the region;

S3: normalizing, for each region, the second importance degree and the information indicator value, and fusing the results of the normalization, to obtain an importance degree reference value corresponding to each region;

S4: inputting the first feature extraction result into the fourth branch to obtain a first importance degree corresponding to each region; and S5: obtaining the loss of the fourth branch based on the difference between the second importance degree reference value and the first importance degree.

In some exemplary embodiments, the target recognition may be based on a mature network in the existing technologies. This is not limited herein. Because the target recognition is only used for determining a relative importance degree of each region rather than an absolute importance degree, requirements for the quality of a target recognition algorithm are not high, and a mature network may be used. It may be understood that a smaller difference between the target recognition result and the label may indicate a less important region.

A specific type of the self-fusion operation is not limited in the present disclosure. The self-fusion operation may fuse the information corresponding to the region that is in the first feature extraction result, and finally, the information may be fused into a value (the information index value). Reference may be made to the existing technologies for the fusion in some exemplary embodiments of the present disclosure, which is not limited herein. All fusion operations in the neural network field may be referred to and selected to support the exemplary embodiments of the present disclosure.

The neural network may be trained based on the first loss and the second loss, and a trained neural network may be used for recognizing objects in the first image to obtain boundary information of the objects.

Figure 5:
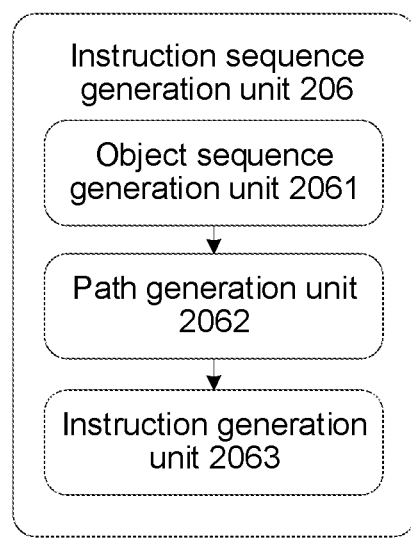
FIG. 5 is a schematic diagram of an instruction sequence generation unit according to some exemplary embodiments of the present disclosure.

In some exemplary embodiments, as shown in FIG. 5, the instruction sequence generation unit may include:
an object sequence generation unit 2061, configured to generate a first object grabbing sequence and a second object grabbing sequence according to the distribution of the objects in the first image.

The object sequence generation unit 2061 may perform the following operations:

S11: dividing a region where the objects are distributed into a first region, a second region, and a third region, where the first region is a region that is accessible to the first robot and in which there is no possibility of collision between the first robot and the second robot, the second region is a region that is accessible to the second robot and in which there is no possibility of collision between the second robot and the first robot, and the third region is a region that is accessible to both the first robot and the second robot and in which there is a possibility of collision between the first robot and the second robot; and S12: determining the first object grabbing sequence and the second object grabbing sequence according to a distribution of objects in the first region, a distribution of objects in the second region, and a distribution of objects in the third region.

For example, a quantity of objects in each region and information about relative positions may be obtained according to a distribution of the objects in each region, and the operation path(s) of the first robot (manipulator) and/or the second robot (manipulator) may be planned according to the quantity of the objects in the each region and the information about the relative position, so as to implement a coordinated operation of the first robot and the second robot (which means the first robot and the second robot do not interfere with each other), for example, reduce operating interference through partition allocation, or reduce interference through operations that reduce congestion.

For example, two types of marks (for example, a first mark is a synchronous mark and a second mark is an asynchronous mark) may be used for distinguishing and planning a synchronous operation and an asynchronous operation (such as an alternate operation). When it is determined that the first robot and second robot execute the sequences without interfering each other, a synchronous mark may be used, and the two robots may operate simultaneously (operate synchronously). When the first robot and the second robot execute sequences that will interfere with each other, an asynchronous mark may be used, and the two robots may not operate synchronously (i.e., asynchronously). They may operate in turn with a preset time difference, for example, they may operate alternately.

In some exemplary embodiments, the robot operation may be planned with a shorter movement path by using an accurate relative position information. For example, when a robot is going to grab one object, an object closest (or closer) to a previous selected object may be selected as the one to be grabbed.

Specifically, the object sequence generation unit 2061 may perform the following operations:

S121: counting a first quantity of the objects in the first region, a second quantity of the objects in the second region, and a third quantity of the objects in the third region;

S122: generating a first object grabbing sequence and a second object grabbing sequence based on the first quantity, the second quantity, and the third quantity; where the first object grabbing sequence may include all the instructions corresponding to the objects in the first region and the second object grabbing sequence may include all the instructions corresponding to the objects in the second region; both the instructions corresponding to the objects in the first region and the instructions corresponding to the objects in the second region may carry synchronization markers, at least one of the first object grabbing sequence or the second object grabbing sequence may include at least one instruction corresponding to the objects in the third region.

In some exemplary embodiments, a method for sorting the objects in the first region may include:

1. selecting, from the first region, an object closest to a current position of the first robot as a current object, and schedule the instruction corresponding to the current object to the first object grabbing sequence;

2. selecting, from the first region, an object that has not been selected before and closest to the current object as a new current object, and schedule the instruction corresponding to the new current object to the first object grabbing sequence; and 3. repeating step 2 when there are still objects not selected in the first region.

A method for sorting the objects in the second region may be the same or similar to the foregoing method, and is not repeated herein.

In order to minimize movement paths of the first robot and the second robot, the objects in a designated region should be grabbed and moved in a certain order.

If the first quantity is equal to the second quantity, and the third quantity is zero, the first object grabbing sequence may be a sequence of instructions corresponding to the objects in the first region, and the second object grabbing sequence may be a sequence of instructions corresponding to the objects in the second region. The instructions corresponding to the objects in a region may indicate that the instructions are used to grab and move the corresponding objects to the pre-set position(s).

If the first quantity is not equal to the second quantity, taking the case when the first quantity is greater than the second quantity as an example, the following method may be implemented. And the same principles may be applicable in the case when the first quantity is less than the second quantity. In some exemplary embodiments, the method may include:

(a) calculating a difference between the first quantity and the second quantity;

(b) if the third quantity is less than or equal to the difference, arranging the first object grabbing sequence with the sequence of instructions corresponding to the objects in the first region; and arranging the second object grabbing sequence with the sequence of instructions corresponding to the objects in the combined region of the second region and the third region;

where the instructions in the first object grabbing sequence and the second grabbing sequence carry synchronous marks; and (c) if the third quantity is greater than the difference, arranging the sequence of instructions corresponding to the objects in the first region into the first object grabbing sequence; and arranging the sequence of instructions corresponding to the objects in the second region into the second object grabbing sequence; and arranging the sequence of instructions corresponding to a certain number of the objects in the third region into the second instruction sequence located after the sequence of instructions corresponding to the objects in the second region, wherein the number is equal to the difference, and where the sequence of instructions corresponding to the objects in the first region, the objects in the second region, and the objects in the third region in which the number is equal to the difference may carry synchronization markers.

In some exemplary embodiments, a sequence of instructions corresponding to a certain number of objects in the third region wherein the number is equal to the difference may be generated in the following way, including:

10. selecting, from the third region, an object closest to the last selected object in the second region as a current object, and arranging the instruction corresponding to the current object as the head of the sequence;

20. randomly selecting, from the third region, an object that is not selected before as a new current object, and arranging the instruction corresponding to the new current object to sequence; and 30. repeating step 20 until the quantity of objects selected from the third region reaches the foregoing difference.

In such a manner of generating the sequence, a movement path of the robots may be shortened, and a generation speed of the sequence may be ensured.

In some exemplary embodiments, a method of generating the sequence of instructions corresponding to a certain number of objects in the third region wherein the number is equal to the difference may be further provided. The method may include:

100. selecting, from the third region, an object closest to the last selected object in the second region as a current object, and arranging the instruction corresponding to the current object to the sequence;

200. selecting, from objects not selected in the third region before, an object having the highest crowding as a new current object, and arranging the instruction corresponding to the current object to the sequence;

where the crowding may represent surrounding environment information of an object. If there is another object at a position relatively close to and around an object W1, and there is no other object at a position relatively close to and around another object W2, a crowding of the object W1 may be greater than that of the object W2. The crowding may represent a congestion degree of an environment in which an object is located and may be calculated by using the following formula $\Sigma 1/\|w-w_e\|$, where w represents an object, $w_e$ represents each object adjacent to the object w, and $\|w-w_e\|$ represents a distance between w and $w_e$;

300. repeating step 200 until the quantity of objects selected from the third region reaches the foregoing difference.

In the method of generating the foregoing sequence, a chance of which the first robot and the second robot may operate synchronously may be increased with a greater probability. This is because that in the method, a congestion degree among the objects in the third region may be minimized, and the reduction of the congestion degree among the objects may be conducive to synchronous operation.

The objects that corresponding to the instructions in the first object grabbing sequence and the second object grabbing sequence obtained in the steps (a) to (c) may be grabbed and moved synchronously, thereby improving the work efficiency. If an object grabbing sequence is generated through the above steps 1-3, a technical effect of shortening a movement path of the end effector may also be achieved.

If a first preset condition is met, the following operations may be performed to generate the first object grabbing sequence and the second object grabbing sequence:

executing a first algorithm, where the first algorithm may be used for selecting a first object in the third region and arranging the instruction corresponding to the first object to the tail of the first object grabbing sequence; and selecting a second object in the third region and arranging the instruction corresponding to the second object to the tail of the second object grabbing sequence;

where the instructions corresponding to the first object and second object both carry synchronous marks; and repeating the first algorithm until a first execution termination condition is met.

The first preset condition may include, for example, two conditions: (1). the first quantity is equal to the second quantity, but the third quantity is not zero; and (2). the first quantity is not equal to the second quantity, but there are still objects not selected in the third region after the steps (a)~(c) are performed.

The first execution termination condition may also include, for example, two conditions: there is no object unselected in the third region (which means the no first object can be selected), or, after the first object is selected, there's no second object can be selected.

In some exemplary embodiments, an execution process of the first algorithm may be described as (a1)~(b1). The execution process of the first algorithm may shorten a movement path of the first robot as much as possible, and may be beneficial to synchronous operation by reducing the congestion degree. The execution process may include:
- (a1) when the first execution termination condition is not met, selecting an object from the unselected objects in the third region and which is closest to the last object corresponding to the instruction at the tail of the first object grabbing sequence as a first object; and selecting an object in the third region, located outside an interference region of the new first object, with the highest crowding as a second object, that an object "located outside the interference region of the first object" means that when the first robot grabs the first object and the second robot grabs an object synchronously, the first robot and the second robot do not collide;
- (b1). arranging the instruction corresponding to the first object to the tail of the first object grabbing sequence, and arranging the instructions corresponding to the second object to the tail of the second object grabbing sequence, where in some exemplary embodiments, both the instructions corresponding to the first object and the second object carry synchronous marks; and
- (c1) repeating the foregoing steps (a1) and (b1) until the first execution termination condition is met.

In some exemplary embodiments, an execution process of the first algorithm may be described as (a10)~(b10). The execution process of the first algorithm may shorten movement paths of the first robot and the second robot as much as possible. The execution process may include:
- (a10). when the first execution termination condition is not met, selecting an object from the unselected objects in the third region and is closest to the last object corresponding to the instruction at the tail of the first object grabbing sequence as a first object; and selecting an object in the third region, located outside an interference region of the new first object, closest to the last object corresponding to the instruction at the tail of the second object grabbing sequence, as a second object;
- (b10). arranging the instruction corresponding to the first object to the tail of the first object grabbing sequence, and arranging the instructions corresponding to the second object to the tail of the second object sequence, where in some exemplary embodiments, both the instructions corresponding to the first object and the second object may carry synchronous marks; and
- (c10) repeat the foregoing steps (a10) and (b10) until the first execution termination condition is met.

When the first execution termination condition is met and there is no object unselected in the third region (i.e., all objects have been selected in the third region), the first object grabbing sequence and the second object grabbing sequence may have been completely generated.

When the first execution termination condition is met, but there are still to-be-selected objects in the third region (for example, the unselected objects are within the interference area of the current first object, so no second object can be selected), the following operations may be further performed:
- executing a second algorithm, where the second algorithm is used for
- selecting a third object from the to-be-selected objects in the third region and arranging the instruction corresponding to the third object to the tail of the first object grabbing sequence; and
- selecting, if there are still to-be-selected objects in the third region, a fourth object from the to-be-selected objects in the third region and arranging the instruction corresponding to the fourth object to the tail of the second object sequence;
- where the instructions corresponding to the first object and second object carry asynchronous marks; and
- repeating the second algorithm until a second execution termination condition is met.

The asynchronous marks may indicate the asynchronous instructions.

The instructions with asynchronous marks may be executed with a preset staggered time difference. For example, when the first robot executes the instruction(s) corresponding to the objects in the third region, the second robot does not immediately enter the third region, waits a period, and enter the third region to execute the instruction corresponding to the fourth object when the first robot is about to leave (or when the first robot is about to rise).

The instructions with asynchronous marks may be alternate instructions. Alternate instructions may be executed by the first robot (the first manipulator) and the second robot (the second manipulator) alternatively, or may be regarded as exclusive instructions. For example, when the first robot (the first manipulator) executes the alternate instruction, the second robot (the second manipulator) does not execute the instruction, and when the first robot (the first manipulator) has completed the alternate instruction, the second robot (the second manipulator) may then execute the instruction while the first robot (the first manipulator) does not execute the instruction.

The second execution termination condition may include two conditions: there's no third or fourth object that can be selected.

In some exemplary embodiments, an execution process of the second algorithm may be described as follows:
- (a100). when the second execution termination condition is not met, selecting an object from the to-be-selected objects in the third region, which is closest to the last object corresponding to the instruction at the tail of the first object sequence, as a third object, and arranging the instruction corresponding to the third object to the tail of the first object grabbing sequence, where the instruction corresponding to the third object carries asynchronous marks;
- (b100). when the second execution termination condition is not met, selecting an object from the to-be-selected objects in the third region, which is closest to the last object corresponding to the instruction at the tail of the second object grabbing sequence, as a fourth object, and arranging the instruction corresponding to the fourth object to the tail of the second object grabbing sequence, where the instruction corresponding to the fourth object includes asynchronous marks; and (c100). continuously repeating the foregoing steps (a100) and (b100) until the second execution termination condition is met.

Through the steps (a100)~(c100), the movement path of the first robot and the second robot may be shortened as much as possible.

A path generation unit 2062 may be configured to generate a first path sequence by using positions of objects, corresponding to the instructions in the first object grabbing sequence, as start points and the second position(s) of the first robot as an end point(s); and generate a second path sequence by using positions of objects corresponding to the instructions in the second object grabbing sequence, as start points and the second position(s) of the second robot as an end point(s).

Specifically, if the instruction in the first object grabbing sequence carries a synchronous mark, a corresponding path may also carry the synchronous mark, and if the instruction in the first object grabbing sequence carries an asynchronous mark, the corresponding path may also carry the asynchronous mark. This is the same for the second path sequence.

An instruction generation unit 2063 may be configured to generate a first instruction sequence based on the first path sequence and generate a second instruction sequence based on the second path sequence. Corresponding to the paths in the first path sequence, instructions for controlling the first robot to move along the paths are generated, and the first instruction sequence is obtained accordingly. Corresponding to the paths in the second path sequence, instructions for controlling the second robot to move along the paths are generated, and the second instruction sequence is obtained accordingly. When robot moves along the path, the robot may grab an object at a start point of the path, and release the object at an end point of the path, so as to complete the transfer of the object. In some exemplary embodiments, an instruction generated based on a path with a synchronous mark may also carry a synchronous mark, and an instruction generated based on a path with an asynchronous mark may also carry an asynchronous mark. In some exemplary embodiments, the instructions with the synchronous mark may be synchronous instructions, that is, the first manipulator and the second manipulator may execute corresponding instructions synchronously. The instructions with the asynchronous mark may be asynchronous, for example, alternate instructions. The alternate instructions may be instructions executed alternately by the first manipulator and the second manipulator, or may be regarded as exclusive instructions. For example, when the first manipulator executes an alternate instruction, the second manipulator does not execute the instruction, and when the first manipulator has completed the alternate instruction, the second manipulator may then execute the instruction while the first manipulator does not execute the instruction.

Specifically, the movement control unit 207 may perform the following operations:

sequentially extracting instructions with synchronous marks from the first instruction sequence to obtain a first sub-sequence; sequentially extracting instructions with asynchronous marks from the first instruction sequence to obtain a second sub-sequence; sequentially extracting instructions with synchronous marks from the second instruction sequence to obtain a third sub-sequence; and sequentially extracting instructions with asynchronous marks from the second instruction sequence to obtain a fourth sub-sequence.

Certainly, when there is no instruction with an asynchronous mark, the second sub-sequence and the fourth sub-sequence are null.

Specifically, a first instruction in the head of the first sub-sequence and a third instruction in the head of the third sub-sequence may be popped out synchronously. "Pop out" in some exemplary embodiments of the present disclosure means obtaining and deleting from an original position. Popping out the first instruction in the head of the first sub-sequence means obtaining an instruction from the head of the first sub-sequence and deleting the obtained instruction from the first sub-sequence.

The first instruction may be transmitted to the first robot to control the first robot to perform a first action, and the third instruction may be synchronously transmitted to the second robot to control the second robot to perform a third action synchronously.

In response to a case that the first robot completes the first action and the second robot completes the third action, a step of synchronously popping out a new first instruction from the head of the first sub-sequence and a new third instruction from the head of the third sub-sequence may be repeated.

The first instruction may be an instruction in the head of the first sub-sequence, and the first action may be an action corresponding to the first instruction. The third instruction may be an instruction in the head of the third sub-sequence, and the third action may be an action corresponding to the third instruction.

In response to a case that both the first sub-sequence and the third sub-sequence are null, and both the second sub-sequence and the fourth sub-sequence are null, a control process ends.

In response to a case that both the first sub-sequence and the third sub-sequence are null and the second sub-sequence is not null, a second instruction at the head of the second sub-sequence may be popped out, and the second instruction may be transmitted to the first robot for the first robot to perform the second action.

In response to a case that the second action is completed and the head of the fourth sub-sequence is null, the control process ends.

In response to a case that the second action is completed and the head of the fourth sub-sequence is not null, a fourth instruction in the head of the fourth sub-sequence may be popped out, and the fourth instruction may be transmitted to the second manipulator for the second manipulator to perform a fourth action.

The second instruction may be an instruction in the head of the second sub-sequence, and the second action may be an action corresponding to the second instruction. The fourth instruction may be an instruction in the head of the fourth sub-sequence, and the fourth action may be an action corresponding to the fourth instruction.

In response to a case that the second robot completes a fourth action, and the remaining second sub-sequence is not null, a new second instruction is popped out from the head of the second sub-sequence and is transmitted to the first robot to perform a new second action.

In response to a case that the second robot completes a fourth action, the remaining second sub-sequence is null, and the fourth sub-sequence is not null, a new fourth instruction is popped out from the head of the fourth sub-sequence and is transmitted to the second robot (manipulator) to perform a new fourth action.

In some exemplary embodiments of the present disclosure, the robot master control system may further include at least one storage medium and at least one processor. Accordingly, the master controller 101, the dual-robot control system 102, the sub-controller, as well as the units and modules described above may be sets of instructions stored in the storage medium and/or may be independent entities that also includes at least one processor and at least one storage medium.

The storage medium may include a data storage device. The data storage device may be a non-transitory storage medium or a temporary storage medium. For example, the data storage device may include one or more of a magnetic disk, a read-only storage medium (ROM), and a random access storage medium (RAM). The storage medium may also include at least one set of instructions stored in the data storage device. The instructions may be computer program code, and the computer program code may include the programs, routines, objects, components, data structures, processes, modules, etc. for executing the methods as provided by the present disclosure.

The at least one processor may be in communication connection with the master controller 101 and the dual-robot control system 102. The at least one processor may also be in communication connection with the at least one storage medium. The at least one processor may be used to execute the at least one set of instructions. When the robot master control system is in operation, the at least one processor may read the at least one set of instructions and executes the methods as provided by the present disclosure according to the instruction of the at least one set of instructions. The at least one processor may perform some or all of the steps included in the methods as provided by the present disclosure. The at least one processor may be in the form of one or more processors. In some exemplary embodiments, the at least one processor may include one or more hardware processors, for example, microcontrollers, microprocessors, reduced set of instructions computers (RISC), application specific integrated circuits (ASICs), application-specific set of instructions processors (ASIP), central processing units (CPU), graphics processing units (GPU), physical processing units (PPU), microcontroller units, digital signal processors (DSP), field programmable gate arrays (FPGA), advanced RISC machines (ARM), programmable logic devices (PLD), or any circuit or processor that is capable of executing one or more functions, or any combination thereof. For the purpose of description, only one processor is described in the robot master control system in the present disclosure. However, it should be noted that the robot master control system in the present application may also include multiple processors. Thus, the operations and/or method steps disclosed in the present disclosure may be performed by one processor as described in the present disclosure, or may be performed jointly by multiple processors. For example, if the at least one processor of the robot master control system performs steps A and B in the present disclosure, it should be understood that step A and step B may be performed jointly or separately by two different processors (for example, a first processor performs step A, a second processor performs step B, or the first and second processors perform steps A and B together).

The robot master control system provided in some exemplary embodiments of the present disclosure may coordinate and comprehensively control multiple robots to grab and move objects. Compared with a single robot, the efficiency may be greatly improved. In addition, each dual-robot control system may be designed individually, thereby improving the work efficiency of coordinated work of dual-robot control systems.

The exemplary embodiments of the present disclosure are described above, and the foregoing disclosures are merely exemplary but not exhaustive and should not be construed as limiting to the disclosed exemplary embodiments. Without departing from the scope and spirit of the described exemplary embodiments, many modifications and variations are apparent to a person of ordinary skill in the technical field. The selected terms used herein is intended to best explain the principles of the exemplary embodiments, practical applications, or improvements of technologies in the market, or to enable other persons of ordinary skill in the technical field to understand the exemplary embodiments disclosed herein.

What is claimed is:

1. A robot master control system, comprising:
    a master controller, configured to control at least one dual-robot control system, wherein each of the least one dual-robot control system includes a first robot, a second robot, and a sub-controller controlling the first robot and the second robot, and
    the sub-controller is controlled by the master controller, and configured to interact with a preset neural network to obtain boundary information of objects in a first image, wherein the first image is transmitted by an image capturing device of each of the at least one dual-robot control system, the neural network includes a hierarchical convolutional network,
    the master controller includes:
        at least one storage medium storing at least one set of instructions, and
        at least one processor in communication with the at least one storage medium, wherein during operation, the at least one processor executes the at least one set of instructions to control the at least one dual-robot control system, the hierarchical convolutional network includes:
        a first branch performing a first feature extraction on an inputted image to obtain a first feature extraction result,
        a second branch receiving the first feature extraction result after a feature filtering operation, and performing a second feature extraction to obtain a second feature extraction result,
        a fourth branch connected to the first branch, and
        a fifth branch connected to the second branch, wherein the at least one processor executes the at least one set of instructions to:
        divide the fourth branch into regions,
        for each region, determine an importance degree based on the first feature extraction result and corresponds to each region to obtain a first importance degree corresponding to the region,
        erase, from the first feature extraction result, information corresponding to a region with a first importance degree greater than a first preset threshold so as to obtain a first correction information,
        output, by the fourth branch, the first correction information, and
        input the first correction information to the second branch.

2. The robot master control system according to claim 1, wherein the each of the dual-robot control system further includes:
    a loading table; and
    the image capturing device, which is configured to:
        take photos of objects on top of the loading table from above to obtain the first image to be transmitted to the sub-controller, wherein the sub-controller is configured to control the first robot and the second robot according to the photos.

3. The robot master control system according to claim 2, wherein the sub-controller is configured to:
obtain a start instruction outputted by the master controller; and
control the loading table to move to a first position,
wherein when the loading table is at the first position, the first robot and the second robot stand on opposite sides of the loading table.

4. The robot master control system according to claim 3, wherein the sub-controller is further configured to:
trigger the image capturing device to perform shooting to obtain the first image; and
analyze the first image to obtain a distribution of the objects on top of the loading table.

5. The robot master control system according to claim 4, wherein to analyze the first image to obtain a distribution of the objects on top of the loading table, the sub-controller is further configured to:
obtain the distribution of the objects in the first image according to the boundary information.

6. The robot master control system according to claim 5, wherein the neural network further includes:
an attention-based coding network;
a fusion network; and
a recognition network.

7. The robot master control system according to claim 6, wherein the neural network is trained by:
obtaining a sample image, wherein labels of the sample image indicate boundary information of objects in the sample image;
performing hierarchical convolution on the sample image based on the hierarchical convolutional network to obtain a first feature information;
performing attention-based coding on the sample image based on the attention-based coding network to obtain second feature information;
fusing the first feature information and the second feature information based on the fusion network to obtain third feature information;
inputting the third feature information into the recognition network to obtain a boundary prediction information; and
optimizing parameters of the neural network based on a difference between the boundary prediction information and the labels.

8. The robot master control system according to claim 6, wherein
the feature filtering operation includes an importance degree determining operation and a feature erasing operation based on a determined importance degree.

9. The robot master control system according to claim 8, wherein the hierarchical convolutional network includes a third branch outputting a third feature extraction result.

10. The robot master control system according to claim 9, wherein the at least one processor executes the at least one set of instructions to:
erase, from the second feature extraction result, information corresponding to a region with a second importance degree greater than a second preset threshold so as to obtain a second correction information;
output, by the fifth branch, second first correction information;
input the second correction information to the third branch; and
output, by the third branch, the third feature extraction result.

11. The robot master control system according to claim 10, wherein the at least one processor executes the at least one set of instructions to fuse the first feature extraction result, the second feature extraction result, and the third feature extraction result to obtain the first feature information.

12. The robot master control system according to claim 5, wherein the sub-controller is further configured to:
obtain a second position, wherein the second position is an end point position to which at least one of the first robot or the second robot conveys an object; and
generate, according to the distribution of the objects in the first image and the second position, a first instruction sequence controlling the first robot and a second instruction sequence controlling the second robot.

13. The robot master control system according to claim 12, wherein to generate the first instruction sequence controlling the first robot and a second instruction sequence controlling the second robot, the sub-controller is further configured to:
generate a first object grabbing sequence and a second object grabbing sequence according to the distribution of the objects in the first image;
generate a first path sequence by using positions of objects corresponding to the first object grabbing sequence as start points and the second position of the first robot as an end point, and
generate a second path sequence by using positions of objects corresponding to the second object grabbing sequence as start points and the second position of the second robot as an end point; and
generate the first instruction sequence based on the first path sequence and generate the second instruction sequence based on the second path sequence.

14. The robot master control system according to claim 13, wherein the sub-controller is further configured to:
control the first robot and the second robot based on the first instruction sequence and the second instruction sequence.

15. The robot master control system according to claim 13, wherein to generate a first object grabbing sequence and a second object grabbing sequence, the at least one processor executes the at least one set of instructions to control the object sequence generation unit to:
divide a region corresponding to the distribution of the objects in the first image into:
a first region only accessible to the first robot,
a second region only accessible to the second robot, and
a third region access to both the first robot and the second robot; and
determine the first object grabbing sequence and the second object grabbing sequence according to a distribution of objects in the first region, a distribution of objects in the second region, and a distribution of objects in the third region.

16. The robot master control system according to claim 15, wherein to determine the first object grabbing sequence and the second object grabbing sequence, the at least one processor executes the at least one set of instructions to control the object sequence generation unit to:
count a first quantity of the objects in the first region, a second quantity of the objects in the second region, and a third quantity of the objects in the third region;

generate a first object grabbing sequence and a second object grabbing sequence based on the first quantity, the second quantity, and the third quantity;

wherein the first object grabbing sequence includes instructions corresponding to the objects in the first region and the second object grabbing sequence includes instructions corresponding to the objects in the second region; both the instructions corresponding to the objects in the first region and the instructions corresponding to the objects in the second region carry synchronization markers indicating synchronizing operations of the first robot and the second robot.

17. The robot master control system according to claim 16, wherein at least one of the first object grabbing sequence or the second object grabbing sequence includes at least one instruction corresponding to the objects in the third region.

* * * * *